C. T. Eames,
Boot Tree,
No. 2,466. Reissued Jan. 29, 1867.
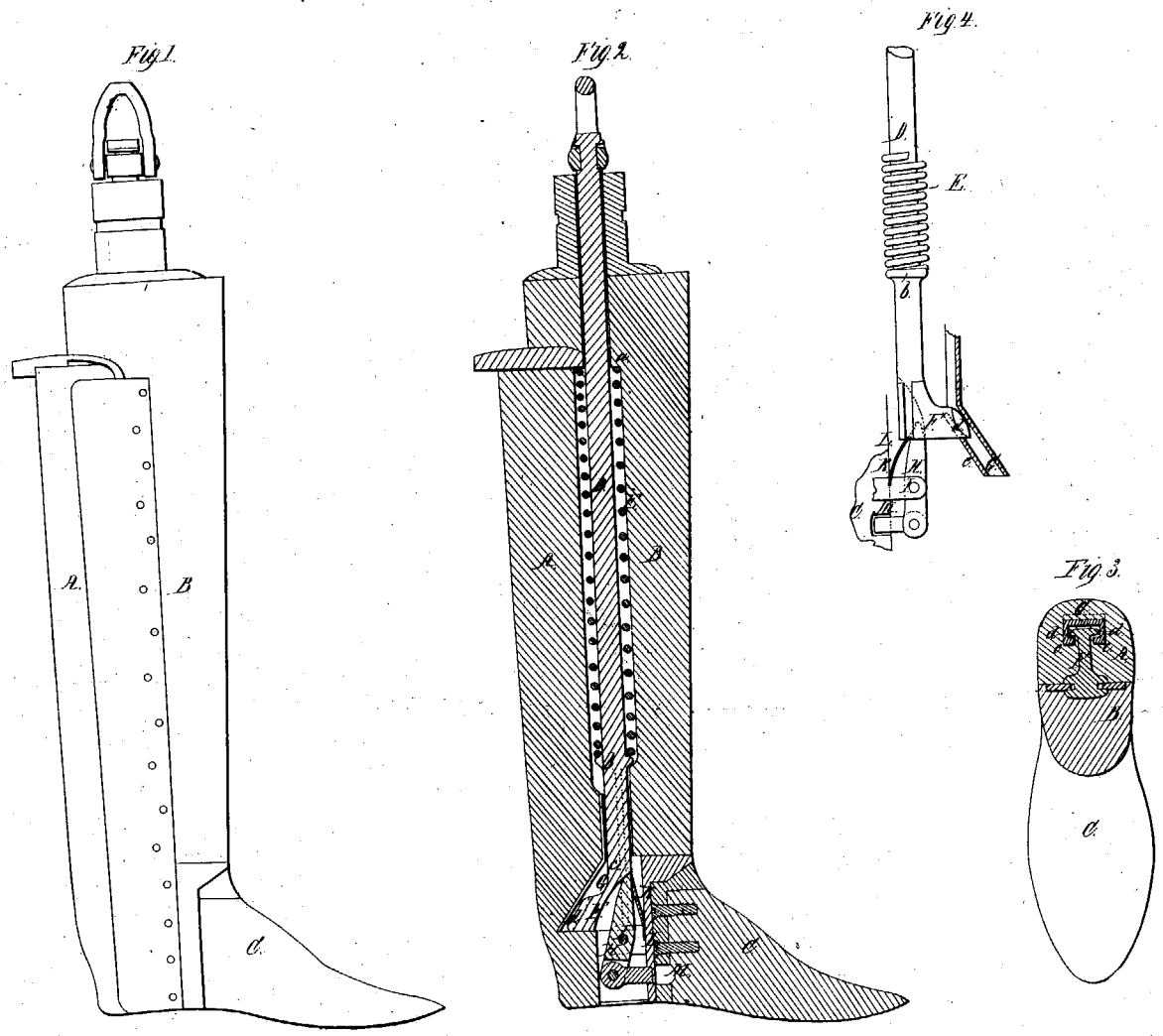
N. PETERS, PHOTO-LITHOGRAPHER, WASHINGTON, D. C.

UNITED STATES PATENT OFFICE.

CHARLES T. EAMES, OF MILFORD, MASSACHUSETTS.

IMPROVEMENT IN BOOT-TREES.

Specification forming part of Letters Patent No. 14,951 dated May 27, 1856; Reissue No. 1,292, dated March 25, 1862; Reissue No. 2,466, dated January 29, 1867.

*To all whom it may concern:*

Be it known that I, CHARLES T. EAMES, of Milford, in the county of Worcester and State of Massachusetts, have invented certain new and useful Improvements in Machines for Treeing Boots; and I do hereby declare that the following is a full, clear, and exact description of the construction and operation of my improved trees, reference being had to the annexed drawings, making a part of this specification, in which—

Figure 1 is a side elevation, Fig. 2 is a central longitudinal section, Fig. 3 is a transverse section, and Fig. 4 is an elevation, of the stretching-rod and locking mechanism.

I construct my improved tree in two main parts, the front B and the back A. On the upper end of the front is a journal (formed to fit in a bearing on the tree-bench or table) and on the lower end is a socket (of the common form) to receive the foot C. On each side of this front lapping brasses are secured to bridge over the space left between the front and back, when the tree is spread. Within the front B and extending out of its upper end is a rod, D, having a swivel on its upper end (to hook upon the lever in the table or bench in the well-known way) and enveloped for a part of its length by the spiral spring E, whose ends bear against shoulders *a* and *b*. This rod is combined with the front B at its upper end by passing through an orifice in the journal, in which it fits loosely, and at its lower end by means of shoulders, which embrace corresponding ways on the front, (as clearly shown in section in Fig. 3,) the rod being thus free to move in the direction of its length, but restrained from any other movement. Below the lower end of this rod is a bent lever, H, whose upper end is pressed against the curved surface of the lower end of the rod by a spring, K, so that when the rod is forced down by the spiral spring E the lever H will be forced in by reason of the inclined face on the lower end of the rod toward the front B, as in Fig. 2, and when the rod is pulled up to distend the tree that lever will be forced out of that spring, thus locking the foot C to the front B, as in Fig. 4. On the lower end of this rod is a cam, F, arranged to work on an inclined plane, G, located in the back of the tree. (See Figs. 2 and 3.) The construction of this cam and inclined plane, though somewhat peculiar, is well known to manufacturers, and therefore is not described.

The operation of this tree is as follows: The foot C is first placed in the boot and the boot is then put upon the tree, (which is supported by its journal on the table or bench,) and the stretching-rod pulled out, all in the usual manner. The lengthwise motion of the rod releases the lever H, which is thrown toward the back by the spring K, and thus locks the foot to the front. At the beginning of the motion of the cam F on the incline G, the lower part of the back is forced out against the corresponding part of the boot, and consequently the foot is forced into the foot of the boot. The further motion of the cam increases the strain upon the lower part of the boot and also strains the leg part, the back acting as a lever, its lower part being the fulcrum through which the strain is transmitted from the bearing of the cam on the inclined plane to the upper part of the leg, and consequently the strain is greater upon the foot part of the boot, which is the stronger part, than on the leg part of the boot, which is the weaker, and requires less strain.

Having thus described the construction and operation of this improved boot-tree, I will now distinguish what is new in it from what is old and well known.

First. Boot-trees of various constructions, having stretching-rods of different kinds combined with their fronts, are well-known; but no tree has ever before been made, to my knowledge, in which the stretching-rod was constructed with shoulders designed to embrace ways which were part of the front itself, which is the first part of my invention, and, as I believe, the most important part, as by this direct combination of the rod and front I am enabled to make a changeable back-mounted tree, much more compact and simple than any heretofore made.

Second. Locking mechanisms, substantially like the mechanism described, are well known, and operating such mechanism by means of the rod is not new, but the arrangement of a rod like mine, moving only in the direction of its length, with the locking mechanism described, and the front B, is, I believe, new, and a better arrangement for locking the foot to the front than any heretofore used. This arrangement constitutes the second part of my invention.

Third. Boot-trees made in two main parts, one of which was a front having a journal on one end and a socket for the foot on the other, are well known, and changeable back boot-trees are also well known; but I believe that the tree herein described is the first changeable back-tree ever constructed in two such parts, which is the third part of my invention.

Fourth. Boot-trees which are operated by means of a single device located below the center of the back are well known, as also are changeable back boot-trees, but the tree described is, so far as I know, the first changeable back-tree ever made in which the foot part of the boot is strained before and more than the leg, which is effected in my tree by the use of a single mechanism for distending, which admits of the backs being readily changed, and which is located below the center of the back. The lower down this single mechanism is located the more the strain will be upon the foot part of the boot, and the less upon the leg part. The best location known to me is that shown in the drawings.

1. I do not claim every combination of every rod and front in a boot-tree; But what I do claim is the combination of the rod D, constructed substantially as described, directly with the front B, for the purpose specified.

2. I do not claim every arrangement of every rod, locking mechanism, and front in a boot-tree; but what I do claim as this part of my invention is the arrangement together of the rod D, the lever H, and its spring, and the front B, substantially as described.

3. I do not claim, broadly, constructing a tree in two parts, or combining the parts of a tree, however constructed, by means of mechanism which admits of the backs being readily changed; but what I do claim as this part of my invention is a boot-tree constructed in two parts, A and B, when such parts are combined by means of a rod, cam, and incline, substantially as and for the purpose specified.

4. I do not claim the use of every single device for distending a tree when the same is located below the center of the back, nor do I claim the use of two or more devices, although the same admit of the backs being readily changed; but what I do claim as this part of my invention is, the use in a boot-tree of a single cam and incline, when the cam is attached to the lower end of stretching-rod, and traverses upon the inclined plane located in the back at or near its lower end, and operating substantially as described.

CHARLES T. EAMES.

Witnesses:
GEO. G. PARKER,
FRANK E. WILKINSON.